(12) United States Patent
Hashimoto et al.

(10) Patent No.: US 12,210,593 B2
(45) Date of Patent: Jan. 28, 2025

(54) RECEIVE OPERATOR INPUT CORRECTING PRODUCT INFORMATION WHEN PRECISION OF IDENTIFICATION OF PRODUCT IS LESS THAN REFERENCE VALUE

(71) Applicant: NEC Corporation, Tokyo (JP)

(72) Inventors: Hiroshi Hashimoto, Tokyo (JP); Kan Arai, Tokyo (JP); Kei Shibuya, Tokyo (JP); Ken Hanazawa, Tokyo (JP); Azusa Furukawa, Tokyo (JP); Makiko Akiguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/801,932

(22) PCT Filed: Feb. 28, 2020

(86) PCT No.: PCT/JP2020/008294
§ 371 (c)(1),
(2) Date: Aug. 24, 2022

(87) PCT Pub. No.: WO2021/171553
PCT Pub. Date: Sep. 2, 2021

(65) Prior Publication Data
US 2023/0140512 A1    May 4, 2023

(51) Int. Cl.
*G06F 18/2415*    (2023.01)
*G06N 3/045*    (2023.01)
(Continued)

(52) U.S. Cl.
CPC ........... *G06F 18/2415* (2023.01); *G06N 5/04* (2013.01)

(58) Field of Classification Search
CPC .............................. G06F 18/2415; G06N 5/04
See application file for complete search history.

(56) References Cited

U.S. PATENT DOCUMENTS 11,501,210 B1 * 11/2022 Zhdanov .................. G06N 5/04
2009/0087854 A1 * 4/2009 Cox ...................... C12Q 1/6883
435/6.16
(Continued)

FOREIGN PATENT DOCUMENTS

JP      2015-129988 A    7/2015
JP      2017-033372 A    2/2017
(Continued)

OTHER PUBLICATIONS

Chen, Liying. Comparison of models for individual patient data meta-analyses of diagnostic accuracy. McGill University (Canada), 2018 (Year: 2018).*
Marshall, Nell. "A Cost Effectiveness Analysis of Using the Ankle-Brachial Index to Screen for Peripheral." (2012). (Year: 2012).*
Gallagher, E. John. "Clinical utility of likelihood ratios." Annals of emergency medicine 31.3 (1998): 391-397. (Year: 1998).*
(Continued)

*Primary Examiner* — Mohsen Almani

(57) ABSTRACT

The present invention provides a processing apparatus (10) including: a classification execution unit (12) that executes class classification, based on an inference device; a computation unit (13) that computes a precision of a class determined by the class classification; a processing unit (14) that outputs a class determined by the class classification and accepts a correct/incorrect input from an operator when the precision is less than a reference value; and a registration unit (15) that registers a product determined by the class classification as a purchase target when the precision is equal to or more than the reference value, and registers a product determined by a correct/incorrect input from the operator as a purchase target when the precision is less than the reference value.

6 Claims, 13 Drawing Sheets

(51) Int. Cl.
*G06N 3/08* (2023.01)
*G06N 5/04* (2023.01)
*G06N 20/00* (2019.01)
*G06T 7/00* (2017.01)

(56) References Cited

U.S. PATENT DOCUMENTS

| | | |
|---|---|---|
| 2015/0193698 A1 | 7/2015 | Nakamura et al. |
| 2019/0120837 A1* | 4/2019 | Eden .................. G16B 40/20 |
| 2019/0172039 A1* | 6/2019 | Kambara ............. G06Q 20/208 |
| 2021/0097279 A1 | 4/2021 | Shiraishi et al. |
| 2021/0188971 A1* | 6/2021 | Sun ..................... G01N 33/535 |

FOREIGN PATENT DOCUMENTS

| | | | |
|---|---|---|---|
| JP | 6161229 | B1 | 7/2017 |
| WO | 2019/163094 | A1 | 8/2019 |

OTHER PUBLICATIONS

Brenner, Hermann, and O. L. A. F. Gefeller. "Variation of sensitivity, specificity, likelihood ratios and predictive values with disease prevalence." Statistics in medicine 16.9 (1997): 981-991: p. 989-990 (Year: 1997).*

Lau, Y. L., et al. "Colorimetric Detection of Dengue by Single Tube Reverse-Transcription-Loop-Mediated Isothermal Amplification." PLoS ONE 10.9 (2015): e0138694 (Year: 2015).*

International Search Report for PCT Application No. PCT/JP2020/008294, mailed on Jun. 9, 2020.

Doi Kenji, "Built a ramen shop classifier from labeld images", IPSJ Magazine, Oct. 15, 2018, vol. 59, No. 11, pp. 971-973, ISSN0447-8053, p. 973, left column.

JP Office Action for JP Application No. 2022-502774, mailed on Aug. 8, 2023 with English Translation.

* cited by examiner

FIG. 3

PRIOR DISTRIBUTION INFORMATION

| PRODUCT IDENTIFICATION INFORMATION | NUMBER OF TIMES OF REGISTRATION |
|---|---|
| 0013212 | 14 |
| 0011189 | 52 |
| . . . | . . . |

FIG. 4

GROUP INFORMATION

| PRODUCT IDENTIFICATION INFORMATION | GROUP NUMBER |
|---|---|
| 0013212 | G001 |
| 0011189 | G027 |
| . | . |
| . | . |
| . | . |

FIG. 6

| PRODUCT A | PRODUCT B | . . . | . . . | . . . |
|---|---|---|---|---|
| . . . | . . . | . . . | . . . | . . . |
| . . . | . . . | . . . | . . . | . . . |
| . . . | . . . | . . . | . . . | . . . |
| . . . | . . . | . . . | . . . | . . . |

WHICH IS THE PRODUCT YOU WANT TO BUY?

NEXT

FIG. 10

PRIOR DISTRIBUTION INFORMATION

| PRODUCT IDENTIFICATION INFORMATION | NUMBER OF TIMES OF REGISTRATION | | |
|---|---|---|---|
| | ENVIRONMENT 1 | ENVIRONMENT 2 | · · · · |
| 0013212 | 12 | 2 | · · · · |
| 0011189 | 21 | 12 | · · · · |
| ⋮ | ⋮ | ⋮ | ⋮ |

FIG. 11

ENVIRONMENT INFORMATION

| ENVIRONMENT NUMBER | CONTENT |
|---|---|
| 1 | MONDAY TO FRIDAY (EXCLUDING NATIONAL HOLIDAY) AND "7:00~22:00" |
| 2 | MONDAY TO FRIDAY (EXCLUDING NATIONAL HOLIDAY) AND "22:00~7:00" |
| 3 | SATURDAY, SUNDAY, AND NATIONAL HOLIDAY AND "7:00~22:00" |
| 4 | SATURDAY, SUNDAY, AND NATIONAL HOLIDAY AND "22:00~7:00" |

FIG. 12

RS INFORMATION

| RS ENVIRONMENT NUMBER | R | S |
|---|---|---|
| RS1 | R1 | S1 |
| RS2 | R2 | S2 |
| ⋮ | ⋮ | ⋮ |

FIG. 13

RS ENVIRONMENT INFORMATION

| RS ENVIRONMENT NUMBER | CONTENT |
|---|---|
| RS1 | "SUNNY" AND "MARCH TO MAY" AND "6:00 ~ 7:00" |
| RS2 | "SUNNY" AND "MARCH TO MAY" AND "7:00 ~ 18:00" |
| RS3 | "SUNNY" AND "MARCH TO MAY" AND "18:00 ~ 6:00" |
| ⋮ | ⋮ |

RECEIVE OPERATOR INPUT CORRECTING PRODUCT INFORMATION WHEN PRECISION OF IDENTIFICATION OF PRODUCT IS LESS THAN REFERENCE VALUE

This application is a National Stage Entry of PCT/JP2020/008294 filed on Feb. 28, 2020, the contents of all of which are incorporated herein by reference, in their entirety.

TECHNICAL FIELD

The present invention relates to a processing apparatus, a processing method, and a program.

BACKGROUND ART

Patent Document 1 discloses that, in face recognition processing of searching a program video for a person to be searched, sorting that uses a precision indicating a possibility of each performer being captured in a program video is performed.

RELATED DOCUMENT

Patent Document

[Patent Document 1] Japanese Patent Application Publication No. 2017-33372

DISCLOSURE OF THE INVENTION

Technical Problem

An inference device generated by machine learning or the like may sometimes give an erroneous inference result. A technique for detecting that there is a possibility that an inference result may be erroneous and correcting the error is desired. Such a technique can prevent inconvenience that subsequent processing is performed based on an erroneous inference result. Patent Document 1 does not disclose such a problem and a solution therefor.

The present invention addresses a problem of providing a technique for detecting that there is a possibility that an inference result of an inference device generated by machine learning or the like may be erroneous and correcting the error.

Solution to Problem

According to the present invention, provided is a processing apparatus including:
  a classification execution means for executing class classification, based on an inference device;
  a computation means for computing a precision of a class determined by the class classification; and
  a processing means for outputting a class determined by the class classification and accepting a correct/incorrect input from an operator when the precision is less than a reference value.

Further, according to the present invention, provided is a processing method including:
  by a computer,
  executing class classification, based on an inference device;
  computing a precision of a class determined by the class classification; and
  outputting a class determined by the class classification and accepting a correct/incorrect input from an operator when the precision is less than a reference value.

Further, according to the present invention, provided is a program causing a computer to function as:
  a classification execution means for executing class classification, based on an inference device;
  a computation means for computing a precision of a class determined by the class classification; and
  a processing means for outputting a class determined by the class classification and accepting a correct/incorrect input from an operator when the precision is less than a reference value.

Advantageous Effects of Invention

According to the present invention, a technique for detecting that there is a possibility that an inference result of an inference device generated by machine learning or the like may be erroneous and correcting the error is achieved.

BRIEF DESCRIPTION OF THE DRAWINGS

FIG. 3 is a diagram schematically illustrating one example of information processed by the processing apparatus according to the present example embodiment.

FIG. 4 is a diagram schematically illustrating one example of information processed by the processing apparatus according to the present example embodiment.

FIG. 6 is a diagram schematically illustrating one example of a screen output by the processing apparatus according to the present example embodiment.

FIG. 10 is a diagram schematically illustrating one example of information processed by the processing apparatus according to the present example embodiment.

FIG. 11 is a diagram schematically illustrating one example of information processed by the processing apparatus according to the present example embodiment.

FIG. 12 is a diagram schematically illustrating one example of information processed by the processing apparatus according to the present example embodiment.

FIG. 13 is a diagram schematically illustrating one example of information processed by the processing apparatus according to the present example embodiment.

DESCRIPTION OF EMBODIMENTS

First Example Embodiment

"Overview"

Figure 1:
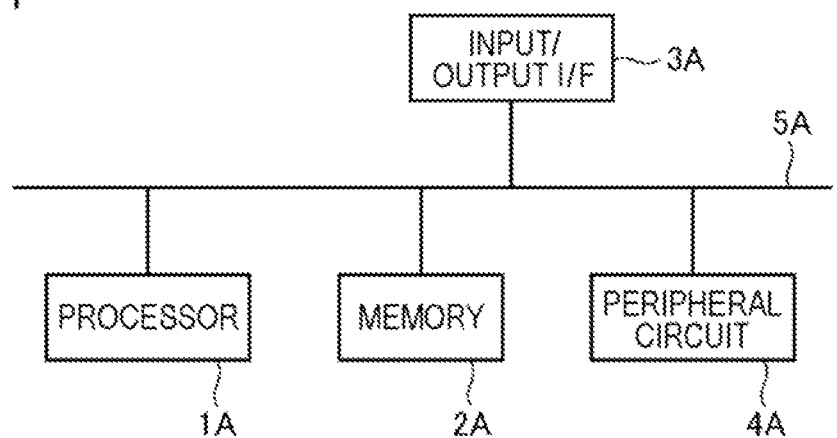
FIG. 1 is a diagram illustrating one example of a hardware configuration of a processing apparatus according to a present example embodiment.

First, an overview of processing executed by a processing apparatus according to a present example embodiment will be described. The processing apparatus executes class classification, based on an inference device generated by machine learning or the like, and then computes a precision of a class determined by the class classification, based on a prior distribution of the determined class. Then, when the precision is equal to or more than a reference value, the processing apparatus executes subsequent processing, based on the determined class. On the other hand, when the precision is less than a reference value, the processing apparatus outputs the determined class and accepts a correct/incorrect input from an operator, and executes subsequent processing, based on a correct class determined by the correct/incorrect input.

An application scene of the processing apparatus according to the present example embodiment will be described. The processing apparatus according to the present example embodiment is used in accounting processing at a store such as a convenience store or a supermarket. One example of the processing apparatus according to the present example embodiment is a so-called point of sales (POS) register. The processing apparatus executes, based on an image photographed of a purchase target product and an inference device, class classification for determining a product included in the image. Then, the processing apparatus computes a precision of the determined product, based on a prior distribution indicating frequency (purchase frequency) with which the determined product is registered as a purchase target. Then, when the precision is equal to or more than a reference value, a processing apparatus 10 registers the determined product as a purchase target. On the other hand, when the precision is less than a reference value, the processing apparatus 10 outputs a determination result and accepts a correct/incorrect input from an operator, and registers a product determined by the correct/incorrect input as a purchase target.

The processing apparatus according to the present example embodiment as described above achieves a technique for detecting that there is a possibility that an inference result of an inference device generated by machine learning or the like may be erroneous and correcting the error. Consequently, inconvenience that subsequent processing is performed based on an erroneous inference result can be prevented. In a case of the above-described application scene, inconvenience that a product different from a product included in an image is registered as a purchase target and accounting processing is performed is prevented.

"Hardware Configuration"

Next, one example of a hardware configuration of the processing apparatus will be described. Each function unit of the processing apparatus is achieved by any combination of hardware and software, mainly including a central processing unit (CPU) of any computer, a memory, a program to be loaded in a memory, a storage unit (in which a program downloaded from a storage medium such as a compact disc (CD), a server on the Internet, or the like can be stored as well as a program stored in advance in a stage of shipping the apparatus) such as a hard disk for storing the program, and an interface for network connection. Then, it should be understood by a person skilled in the art that there are a variety of modification examples for a method or an apparatus for achieving the same.

FIG. 1 is a block diagram illustrating a hardware configuration of the processing apparatus. As illustrated in FIG. 1, the processing apparatus includes a processor 1A, a memory 2A, an input/output interface 3A, a peripheral circuit 4A, and a bus 5A. The peripheral circuit 4A includes various modules. The processing apparatus may not include the peripheral circuit 4A. Note that, the processing apparatus may be configured by a plurality of physically and/or logically separated apparatuses, or may be configured by one physically and/or logically unified apparatus. When the processing apparatus is configured by a plurality of physically and/or logically separated apparatuses, the plurality of individual apparatuses can include the above hardware configuration.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU or a graphics processing unit (GPU). The memory 2A is a memory such as, for example, a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each module to perform an operation, based on an operation result thereof "Function Configuration"

Figure 2:
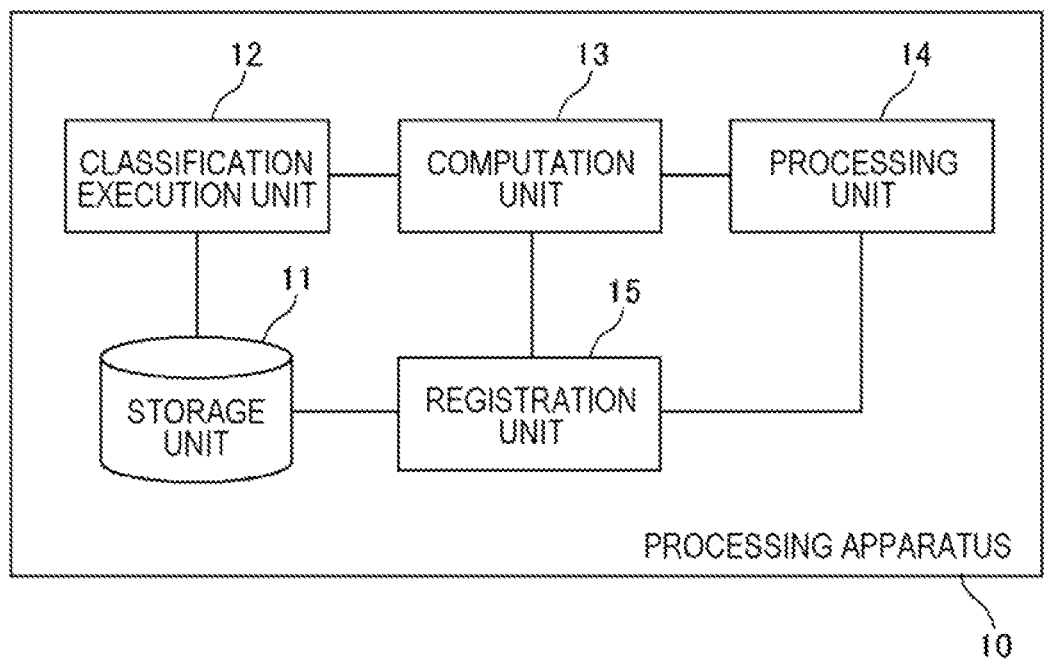
FIG. 2 is one example of a function block diagram of the processing apparatus according to the present example embodiment.

Next, a function configuration of the processing apparatus will be described. As illustrated in FIG. 2, a processing apparatus 10 includes a storage unit 11, a classification execution unit 12, a computation unit 13, a processing unit 14, and a registration unit 15.

The storage unit 11 stores various kinds of information necessary for processing in the present example embodiment. For example, the storage unit 11 stores an inference device (estimation model) that determines a product included in an image. The inference device determines a product included in an image. For example, the inference device is generated by machine learning based on training data in which a product image is associated with product identification information (product name, product code, or the like).

The classification execution unit 12 executes class classification, based on the inference device. First, the classification execution unit 12 acquires an image photographed of a purchase target product. The photographing is performed by an operator (example: a store clerk or a customer) who executes accounting processing. Then, the classification execution unit 12 determines, by the image and the class classification based on the inference device stored in the storage unit 11, a product included in the image. The classification execution unit 12 may input the acquired image as is to the inference device, or may input the acquired image to the inference device after predetermined processing (example: noise removal, object detection, background removal, trimming, or the like) is performed thereon. An inference result of the inference device indicates product identification information or the like on a product determined as a product included in an image. Note that, a configuration of a camera for photographing a product, a photographing method, a method of inputting an image to the processing apparatus 10, or the like is a matter of design choice, and any technique can be employed.

The computation unit 13 computes a precision of a class determined by the class classification of the classification execution unit 12. In other words, the computation unit 13 computes a precision of a product determined as a product included in an image.

Herein, a detail of processing of computing a precision will be described. The computation unit 13 computes a precision of a class (product) determined by class classification, based on a prior distribution of the class. Specifically, the computation unit 13 computes a precision P, based on a following equation (1).

[Mathematical 1]

$$P = \frac{pR}{pR + (1-p)(1-S)} \quad \text{Equation (1)}$$

R is a recall, and S is specificity. In the present example embodiment, the recall R and the specificity S are fixed values. In other words, the recall R and the specificity S are identical values, regardless of an environment (time of day, weather, or the like) at a time of accounting processing or a result of class classification. p is a prior distribution. In the present example embodiment, the prior distribution p indicates frequency with which a determined product is registered by the processing apparatus 10 as a purchase target. The prior distribution p is computed based on a registration history of each product at a time of accounting processing for the product.

In other words, the computation unit 13 retrieves a value of the recall R and the specificity S stored in advance in the storage unit 11. Further, the computation unit 13 computes the latest prior distribution p of a determined product, based on a registration history of each product at a time of accounting processing for the product. Then, the computation unit 13 inputs, to the above equation (1), the retrieved recall R and the specificity S and the computed prior distribution p to compute the precision P.

Herein, the above equation (1) will be described. First, following parameters are defined.

TP: true positive: the number of correct answers inferred to be correct

FP: false positive: the number of incorrect answers inferred to be correct

FN: false negative: the number of correct answers inferred to be incorrect

TN: true negative: the number of incorrect answers inferred to be incorrect

In general, it is known that the precision P, the recall R, the specificity S, and the prior distribution p are computed by following equations (2) to (5). The above equation (1) is acquired by modifying the equations.

[Mathematical 2]

$$P = TP/(TP+FP) \quad \text{Equation (2)}$$

[Mathematical 3]

$$R = TP/(TP+FN) \quad \text{Equation (3)}$$

[Mathematical 4]

$$S = TN/(TN+FP) \quad \text{Equation (4)}$$

[Mathematical 5]

$$p = (TP+FN)/(TP+FN+TN+FP) \quad \text{Equation (5)}$$

Next, setting the recall R and the specificity S as fixed values and a method of determining the value will be described.

The recall R and the specificity S vary depending on difficulty of recognition by an inference device. The difficulty of recognition largely depends on how an inference target included in an image is captured, and differs depending on, for example, an optical environment (light from outside, indoor light, type of indoor light, a relative relationship (distance, direction, or the like) between light and a subject, or the like) at a time of photographing, a relative relationship (distance, direction, or the like) between an inference target (subject) and a camera, and the like.

However, in a case of the present example embodiment in which the processing apparatus 10 is used in accounting processing at a store, it can be assumed that the difficulty of recognition is invariable regardless of an execution environment. In other words, in a case of the present example embodiment, light giving influence on photographing is indoor light, and influence of light from outside is ignorable. Then, intensity or the like of indoor light is generally invariable regardless of time or the like. Further, a room light or a camera for use in accounting processing is generally fixed at a predetermined position, and thus, a relative relationship (distance, direction, or the like) therebetween is generally invariable regardless of time or the like. Furthermore, a method of photographing a purchase target product with a camera at a time of accounting processing is manualized, and thus, a relative relationship (distance, direction, or the like) between an inference target (subject) and a camera does not largely vary even with some variation by each operator.

The present inventor newly found that the present example embodiment is in such an environment where the recall R and the specificity S can be assumed as invariable, and newly conceived of setting the values as fixed values.

A value of the recall R and the specificity S can be computed, for example, based on a result of a test for the class classification of the classification execution unit 12, executed at a predetermined place before the processing apparatus 10 is actually used at a store, and the above equations (3) and (4). A place for executing the test is preferably a store, but may be another place.

Next, a method of computing the prior distribution p will be described. In a case of the present example embodiment in which the processing apparatus 10 is used in accounting processing at a store, the prior distribution p indicates frequency (purchase frequency) with which a product determined by class classification is registered as a purchase target.

For example, the prior distribution p in the present example embodiment is a ratio of "the number of times registering a product determined by class classification as a purchase target" to "the total number of times registering individual products being handled at a store as a purchase target". "Registration as a purchase target" herein is processing achieved by the registration unit 15 to be described below, and is registration as a purchase target with an accounting apparatus such as a POS register at a time of accounting processing.

The storage unit 11 stores prior distribution information in which product identification information on individual products being handled at a store is associated with the number of times each product is registered as a purchase target, as illustrated in FIG. 3. The prior distribution information is updated every time accounting processing is performed. Then, the computation unit 13 computes the above-described prior distribution p, based on the prior distribution information.

Note that, "the total number of times registering individual products being handled at a store as a purchase target" may be the total number of times registering all of products being handled at the store.

Besides the above, "the total number of times registering individual products being handled at a store as a purchase target" may be the total number of times registering a part of products being handled at the store. A part of products can be, for example, a group of products (a product group having a similar appearance) that have a similar appearance to a product determined by class classification and are relatively difficult to distinguish from each other by the class classification of the classification execution unit 12. A group of products that are relatively difficult to distinguish from each other by class classification may be, for example, a group of products (beverages, shampoos, toothpastes, or the like) of a same kind, may be a group of products of a same kind of a same manufacturer, may be a group of products of a same series of a same manufacturer, or may be others.

The storage unit 11 may store group information indicating a group of products that are relatively difficult to distinguish from each other by the class classification of the classification execution unit 12, as illustrated in FIG. 4. Then, the computation unit 13 may determine, based on the group information, a product associated with a same group number as a product determined by class classification, and may compute the total "number of times registering a product (including a product determined by class classification) associated with a same group number as a product determined by class classification, as "the total number of times registering individual products being handled at a store as a purchase target".

Note that, in the present example embodiment, the frequency is frequency with which each product is registered as a purchase target at one store in which the processing apparatus 10 is installed. In other words, the frequency indicates purchase frequency of each product at the store in which the processing apparatus 10 is installed. As a modification example, the frequency may be frequency with which the product is registered as a purchase target at a group of a plurality of stores. In other words, the frequency may be purchase frequency of each product at all of a plurality of stores. A group of a plurality of stores is preferably a group of stores having a similar tendency of a product purchased by a customer, and examples thereof include, for example, a group of stores having a similar location condition (example: there is a station within 100 m, there is a university within 100 m, or the like).

Returning to FIG. 2, the processing unit 14 outputs a class (product) determined by the class classification of the classification execution unit 12 and accepts a correct/incorrect input from an operator when the precision P computed by the computation unit 13 is less than a reference value. The processing unit 14 outputs the information toward an operator who executes accounting processing, and accepts a correct/incorrect input from the operator. Output of information is achieved via any output apparatus such as a display, a speaker, or a projection apparatus. Further, acceptance of an input is achieved via any input apparatus such as a touch panel, a physical button, a microphone, a mouse, or a keyboard.

Figure 5:
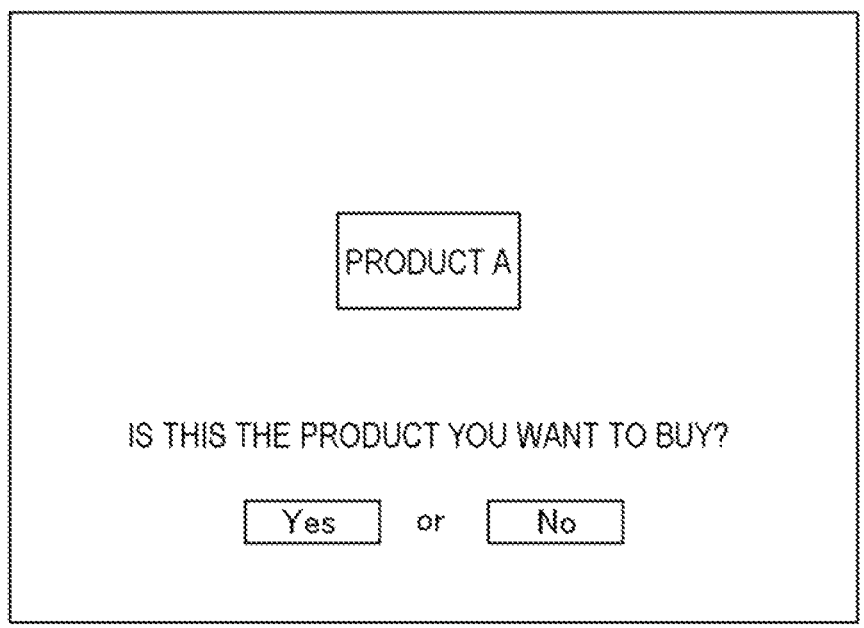
FIG. 5 is a diagram schematically illustrating one example of a screen output by the processing apparatus according to the present example embodiment.

For example, the processing unit 14 may display a screen as illustrated in FIG. 5 on a touch panel display, and may accept an input. On the screen illustrated in FIG. 5, information identifying a product determined by the class classification of the classification execution unit 12 is displayed, and an input answering whether the information is correct is accepted. Then, when accepting an input "No" on the screen, the processing unit 14 may display a screen as illustrated in FIG. 6 on a touch panel display, and may accept an input. On the screen illustrated in FIG. 6, a list of products being handled at a store is displayed, and an input specifying one of the products is accepted.

Figure 7:
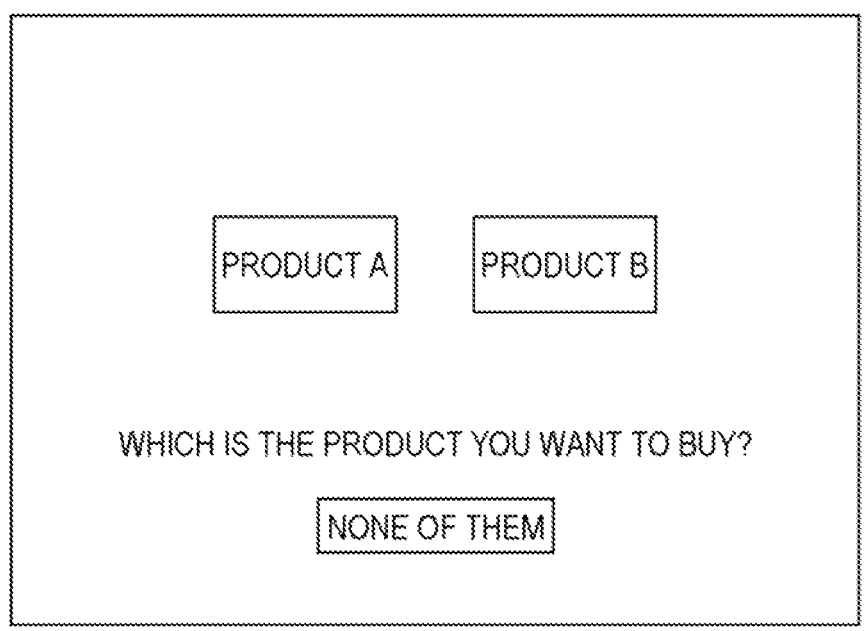
FIG. 7 is a diagram schematically illustrating one example of a screen output by the processing apparatus according to the present example embodiment.

Besides the above, the processing unit 14 may display a screen as illustrated in FIG. 7 on a touch panel display, and may accept an input. On the screen illustrated in FIG. 7, a part of a plurality of products selected from among products being handled at a store is displayed as candidates for a purchase target product. Then, on the screen, an input specifying one of the candidates is accepted. When accepting an input "None of them" on the screen, the processing unit 14 may display the screen as illustrated in FIG. 6 on a touch panel display, and may accept an input.

Herein, one example of a method of selecting a candidate for a product to be displayed on the screen illustrated in FIG. 7 will be described.

(Selection method 1) A predetermined number of products are selected in descending order of a value of a prior distribution at that point in time.

(Selection method 2) A product that is included in a predetermined number of products in descending order of a value of a prior distribution at that point in time and that has a value of the prior distribution equal to or more than a reference value is selected.

(Selection method 3) A product determined by the class classification of the classification execution unit 12 is selected in addition to a product selected by selection method 1 or 2.

(Selection method 4) A predetermined number of products are selected in descending order of a value of a prior distribution at that point in time from among products associated with a same group number as a product determined by the class classification of the classification execution unit 12.

(Selection method 5) A product that is included in a predetermined number of products in descending order of a value of a prior distribution at that point in time among products associated with a same group number as a product determined by the class classification of the classification execution unit 12 and that has a value of the prior distribution equal to or more than a reference value is selected.

(Selection method 6) A product determined by the class classification of the classification execution unit 12 is selected in addition to a product selected by selection method 4 or 5.

(Selection method 7) When an inference device outputs a posterior distribution, a product is selected after replacing a value of a prior distribution for a value of the posterior distribution in selection methods 1 to 6.

Returning to FIG. 2, the registration unit 15 registers a product determined by the class classification of the classification execution unit 12 as a purchase target when the precision P computed by the computation unit 13 is equal to or more than a reference value. Then, the registration unit 15 registers a product determined by a correct/incorrect input from an operator accepted by the processing unit 14 as a purchase target when the precision P is less than the reference value.

For example, the registration unit 15 acquires, from a product master stored in a store server, product information (product name, unit price, or the like) on a product to be registered as a purchase target, and stores the product information in the storage unit 11.

Figure 8:
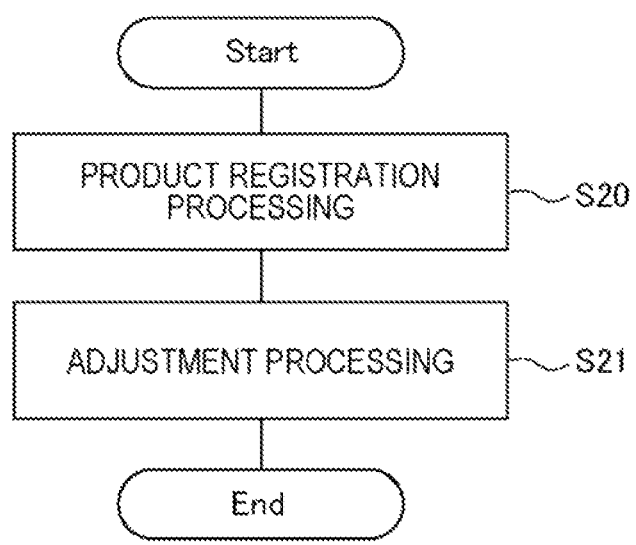
FIG. 8 is a flowchart illustrating one example of a flow of processing of the processing apparatus according to the present example embodiment.

Next, one example of a flow of processing of the processing apparatus 10 will be described by using a flowchart in FIG. 8.

In a case of the present example embodiment in which the processing apparatus 10 is used in accounting processing at a store, the processing apparatus 10 repeats product registration processing S20 of registering a purchase target product and adjustment processing S21 based on a registration content.

Figure 9:
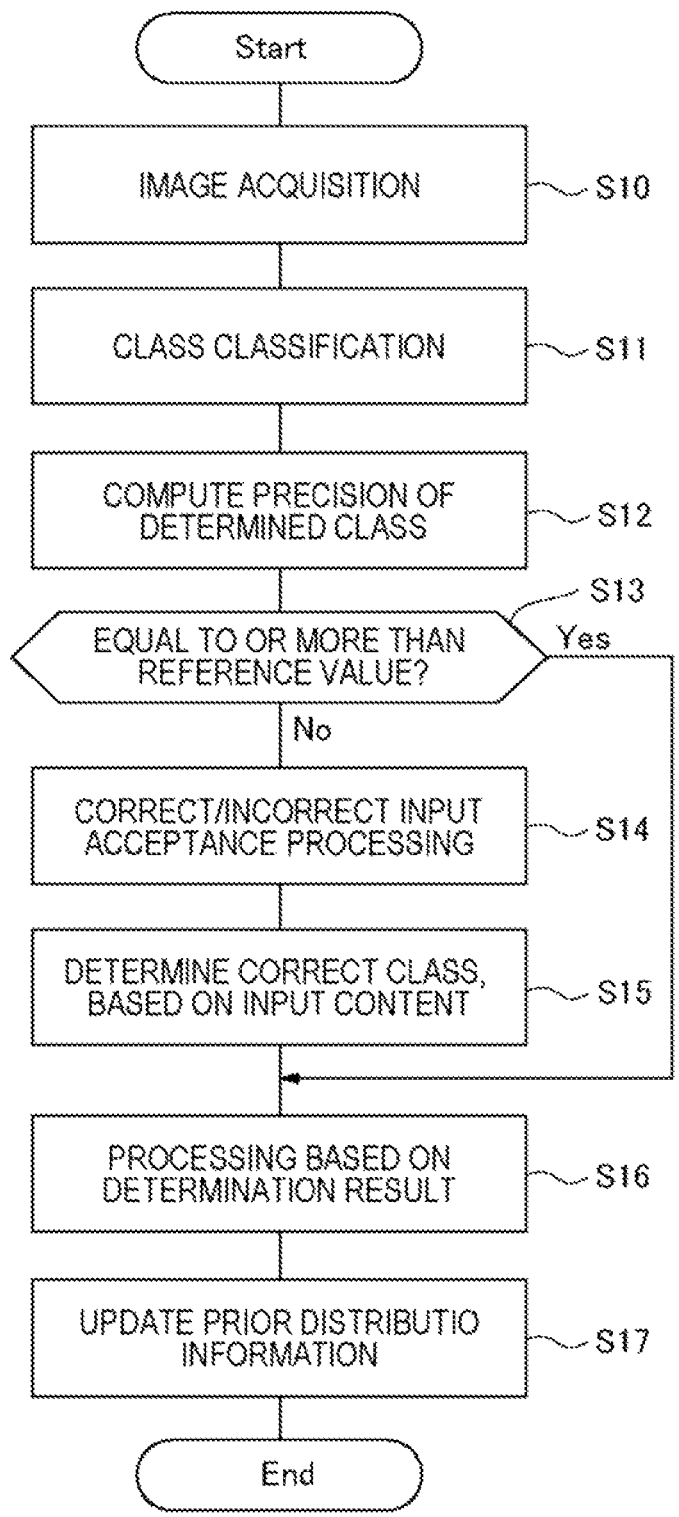
FIG. 9 is a flowchart illustrating one example of a flow of processing of the processing apparatus according to the present example embodiment.

In the product registration processing S20, the processing apparatus 10 repeats processing illustrated by a flowchart in FIG. 9.

First, an operator performs an operation of photographing a purchase target product. The classification execution unit 12 acquires an image generated by the photographing (S10). Next, the classification execution unit 12 executes, based on an inference device stored in the storage unit 11 and the image acquired in S10, class classification for determining a product included in the image (S11).

Next, the computation unit 13 computes the precision P of the product determined by the class classification in S11 (S12). Specifically, the computation unit 13 computes a prior distribution of the product determined by the class classification in S11, based on prior distribution information (see FIG. 3) at that point in time. Then, the computation unit 13 computes the precision P, based on the recall R and the specificity S stored in advance in the storage unit 11, the computed prior distribution, and the above-described equation (1).

When the computed precision P is equal to or more than a reference value (Yes in S13), the registration unit 15 registers the product determined by the class classification in S11 as a purchase target (S16). For example, the registration unit 15 acquires product information (product name, unit price, or the like) on the product from a product master stored in a store server, and stores the product information in the storage unit 11. Next, the registration unit 15 updates the prior distribution information (see FIG. 3) (S17). In other words, the registration unit 15 increments by "1" the number of times registering the product registered as a purchase target.

On the other hand, when the computed precision P is less than a reference value (No in S13), the processing unit 14 executes correct/incorrect input acceptance processing of outputting the product determined by the class classification in S11 and accepting a correct/incorrect input from an operator (S14). Then, the registration unit 15 determines a correct product, based on a content of the correct/incorrect input in S14 (S15), and registers the product determined based on the content of the correct/incorrect input in S14 as a purchase target (S16). For example, the registration unit 15 acquires product information (product name, unit price, or the like) on the product from a product master stored in a store server, and stores the product information in the storage unit 11. Next, the registration unit 15 updates the prior distribution information (see FIG. 3) (S17). In other words, the registration unit 15 increments by "1" the number of times registering the product registered as a purchase target. Processing in S16 and S17 is as described above.

After the processing illustrated by the flowchart in FIG. 9 is performed at least once and at least one product is registered as a purchase target, the processing apparatus 10 becomes able to accept an input for proceeding to adjustment processing. Then, the processing apparatus 10 executes the adjustment processing S21 in response to the input.

For example, the processing apparatus 10 performs, in the adjustment processing S21, adjustment for an accounting amount computed based on a registration content in the product registration processing S20 by accepting an input of credit card information, communicating with a server of a credit card company to perform payment processing, accepting an input of a deposit amount, computing change, giving computed change, executing other processing such as code payment, and issuing a receipt.

Besides the above, the processing apparatus 10 may transmit, in the adjustment processing S21, an accounting amount computed based on a registration content in the product registration processing S20 or a detailed statement or the like of a purchase target product to an adjustment apparatus physically and/or logically separated from the processing apparatus 10. Then, the adjustment apparatus may accept an input of credit card information, communicate with a server of a credit card company to perform payment processing, accept an input of a deposit amount, compute change, give computed change, execute other processing such as code payment, and issue a receipt. This example assumes a situation in which an apparatus for registering a purchase target product and an apparatus for performing adjustment processing are physically and/or logically separated.

"Advantageous Effect"

The processing apparatus 10 according to the present example embodiment described above achieves a technique for detecting that there is a possibility that an inference result of an inference device generated by machine learning or the like may be erroneous and correcting the error. Thus, inconvenience that subsequent processing is executed based on an erroneous inference result can be reduced. In a case of the present example embodiment in which the processing apparatus 10 is used in accounting processing at a store, inconvenience that a product different from a product included in an image is registered as a purchase target and accounting processing is performed is prevented.

Further, the processing apparatus 10 according to the present example embodiment can compute the precision P of each product, based on a prior distribution indicating frequency with which each product is registered as a purchase target. By using such a characteristic prior distribution, the precision P can be computed with high accuracy and an error of an inference result can be detected with high accuracy.

Further, the processing apparatus 10 according to the present example embodiment can compute the precision P, based on the characteristic equation (1) as described above. Thus, the highly accurate precision P can be computed relatively simply.

Further, the processing apparatus 10 according to the present example embodiment is used under an environment where the recall R and the specificity S can be assumed as invariable regardless of an execution environment, and thus, the recall R and the specificity S can be set as fixed values among the parameters included in the above equation (1). Thus, burden on processing of the processing apparatus 10 can be reduced.

Second Example Embodiment

A processing apparatus 10 according to a present example embodiment is different from the first example embodiment in terms of a way of computing a prior distribution (purchase frequency). Specifically, the processing apparatus 10 determines an environment at a time of accounting processing, and computes a prior distribution (purchase frequency) under the environment.

A storage unit 11 according to the present example embodiment stores prior distribution information as illustrated in FIG. 10 and environment information as illustrated in FIG. 11. As illustrated in FIG. 10, the prior distribution information according to the present example embodiment indicates the number of times each product is registered as a purchase target under each environment. In other words, the prior distribution information records an environment at a time when each product is registered as a purchase target. Each environment may be determined by one or more of parameters such as day of week, time of day, season, weather, product manufacturer, product shape, product type, purchaser information, and stock information (stock availability or stock quantity).

A computation unit 13 first determines an environment at that time when computing a prior distribution and a precision P. The computation unit 13 may acquire a value of various kinds of parameters determining an environment as described above, based on information stored in the processing apparatus 10, or may acquire from an external apparatus. Then, the computation unit 13 determines an environment (environment number) at that time, based on the acquired value of various kinds of parameters and the environment information as illustrated in FIG. 11.

After determining the environment, the computation unit 13 refers to the prior distribution information as illustrated in FIG. 10, and computes a ratio of "the number of times registering a product determined by class classification as a purchase target under the determined environment" to "the total number of times registering individual products being handled at a store as a purchase target under the determined environment", as a prior distribution of the product determined by the class classification under the environment.

Other configurations of the processing apparatus 10 are similar to the first example embodiment.

The processing apparatus 10 according to the present example embodiment achieves an advantageous effect similar to the first example embodiment. Further, the processing apparatus according to the present example embodiment in which a prior distribution and the precision P of each product can be computed in consideration of an environment at a time of accounting processing is able to more accurately detect that there is a possibility that an inference result of an inference device generated by machine learning or the like may be erroneous.

Third Example Embodiment

A processing apparatus 10 according to a present example embodiment prepares a recall R and specificity S for each environment at a time of accounting processing, rather than setting as fixed values. Then, the processing apparatus 10 computes a precision P by using the recall R and the specificity S associated with an environment at a time of accounting processing.

A storage unit 11 according to the present example embodiment stores RS information as illustrated in FIG. 12 and RS environment information as illustrated in FIG. 13.

As illustrated in the figures, in the present example embodiment, an environment at a time of accounting processing is classified into a plurality of environments, and the recall R and the specificity S are stored in advance in the storage unit 11 for each environment. For example, a test for class classification of a classification execution unit 12 to be performed at a predetermined place before the processing apparatus 10 is actually used at a store is performed under a plurality of individual environments, and a plurality of test results under each environment are collected. Then, the recall R and the specificity S can be computed for each environment, based on the result of the test under each environment and the above equations (3) and (4).

A computation unit 13 first determines an environment at that time when computing the precision P. The computation unit 13 may acquire a value of various kinds of parameters determining an environment as described above, based on information stored in the processing apparatus 10, or may acquire from an external apparatus. Then, the computation unit 13 determines an environment (RS environment number) at that time, based on the acquired value of various kinds of parameters and the RS environment information as illustrated in FIG. 13. After determining the environment, the computation unit 13 acquires the recall R and the specificity S for use in computation of the precision P, based on the RS information as illustrated in FIG. 12.

Other configurations of the processing apparatus 10 are similar to the first and second example embodiments.

The processing apparatus 10 according to the present example embodiment achieves an advantageous effect similar to the first and second example embodiments. Further, the processing apparatus 10 according to the present example embodiment in which the recall R and the specificity S can be determined in consideration of an environment at a time of accounting processing is able to more accurately detect that there is a possibility that an inference result of an inference device generated by machine learning or the like may be erroneous.

The processing apparatus 10 according to the present example embodiment cannot assume that the recall R and the specificity S are invariable regardless of an execution environment, but can be used under such a situation in which an execution environment is classified and the recall R and the specificity S can be assumed as invariable under each execution environment. In a case of the present example embodiment in which the processing apparatus 10 is used in accounting processing at a store, for example, a case in which the processing apparatus 10 is installed near a window or a door and influence of light from outside is not ignorable for photographing of a product or the like pertains to the situation.

Modification Example

In the first to third example embodiments, the processing apparatus 10 is used in accounting processing at a store. However, a usage scene of the processing apparatus 10 is not limited thereto. The processing apparatus 10 according to the first to second example embodiments can be used in various kinds of scenes in which the recall R and the specificity S can be assumed as invariable regardless of an execution environment. Further, the processing apparatus 10 according to the third example embodiment can be used in various kinds of scenes in which an execution environment is classified and the recall R and the specificity S can be assumed as invariable under each execution environment. Note that, in a modification example, a processing apparatus 10 may include, in place of the registration unit 15, an execution unit that executes predetermined processing, based on a determination result of class classification. The execution unit executes predetermined processing, based on a determination result of class classification when a precision is equal to or more than a reference value, and executes predetermined processing, based on a determination result based on a correct/incorrect input from an operator when the precision is less than the reference value. A detail of predetermined processing is a matter of design choice.

Note that, "acquisition" in the present description may include "fetching (active acquisition), by an own apparatus, data stored in another apparatus or storage medium" based on a user input or based on an instruction of a program, for example, requesting or inquiring another apparatus to receive data, accessing another apparatus or storage medium to read out data therefrom, and the like. Further, "acquisition" may include "inputting (passive acquisition), to an own apparatus, data output from another apparatus" based on a user input or based on an instruction of a program, for example, receiving delivered (transmitted, push-notified, or the like) data, and the like. Further, "acquisition" may include selectively acquiring received data or information, and "generating new data by editing data (such as conversion to a text, sorting of data, extraction of partial data, or change of a file format) or the like and acquiring the new data".

While the present invention has been described with reference to the example embodiments (and the examples), the present invention is not limited to the above example embodiments (and the examples). Various modifications that can be understood by those skilled in the art can be made to the configurations and details of the present invention within the scope of the present invention.

The whole or part of the above-described example embodiments can be described as, but not limited to, the following supplementary notes.

1. A processing apparatus including:
    a classification execution means for executing class classification, based on an inference device;
    a computation means for computing a precision of a class determined by the class classification; and
    a processing means for outputting a class determined by the class classification and accepting a correct/incorrect input from an operator when the precision is less than a reference value.
2. The processing apparatus according to supplementary note 1, wherein
    the computation means computes the precision, based on a prior distribution of a class determined by the class classification.
3. The processing apparatus according to supplementary note 2, wherein
    the computation means computes the precision, based on the above equation (1).
4. The processing apparatus according to supplementary note 3, wherein
    R and S are fixed values.
5. The processing apparatus according to supplementary note 3, wherein
    a value for R and S is prepared for each environment in advance, and R and S are determined based on an environment at a time of computing the precision.
6. The processing apparatus according to any of supplementary notes 2 to 5, wherein the classification execution means determines, by an image photographed of a product and class classification based on the inference device, a product included in the image,
the processing apparatus further including
a registration means for registering a product determined by the class classification as a purchase target when the precision is equal to or more than the reference value, and registering a product determined by a correct/incorrect input from the operator as a purchase target when the precision is less than the reference value, wherein
the prior distribution indicates frequency with which a product determined by the class classification is registered as a purchase target.
7. The processing apparatus according to supplementary note 6, wherein
    the prior distribution is a ratio of a number of times registering a product determined by the class classification as a purchase target to a total number of times registering individual products being handled at a store as a purchase target.
8. The processing apparatus according to supplementary note 6 or 7, wherein
    the computation means computes the prior distribution of a product determined by the class classification under an environment at a time of computing the precision, based on information recording an environment at a time when each product is registered as a purchase target, and computes the precision, based on the computed prior distribution.
9. A processing method including:
    by a computer,
    executing class classification, based on an inference device;
    computing a precision of a class determined by the class classification; and
    outputting a class determined by the class classification and accepting a correct/incorrect input from an operator when the precision is less than a reference value.
10. A program causing a computer to function as:
    a classification execution means for executing class classification, based on an inference device;
    a computation means for computing a precision of a class determined by the class classification; and
    a processing means for outputting a class determined by the class classification and accepting a correct/incorrect input from an operator when the precision is less than a reference value.

What is claimed is:
1. A point-of-sale (POS) register installed in a store comprising:
    a processing apparatus comprising:
    at least one memory configured to store one or more instructions; and
    at least one processor configured to execute the one or more instructions to:
    acquire an image captured by a camera installed in the store along with the POS register, the image including a product;
    determine an identification of the product included in the image by inputting the image to an inference device and receiving as output from the inference device an inference result including the identification of the product;

compute, based on a history of POS registers, a prior distribution of the product, the prior distribution indicating a purchase frequency of the product;

compute a precision of the identification of the product according to a predetermined equation, based on the computed prior distribution, the predetermined equation being:

$$P = \frac{pR}{pR + (1-p)(1-S)}, \quad \text{Equation (1)}$$

where P is the precision, p is the prior distribution, R is recall, and S is specificity;

determine that the precision is less than a reference value;

in response to determining that the precision is less than the reference value, display on a display device a user interface showing the identification of the product to the operator and a request that the operator confirm or correct the identification of the product;

after displaying the user interface, receive via an input device input from the operator correcting the identification of the product;

receive input of credit card information to pay for the product based on the corrected identification; and transmit the credit card information to a server of a credit card company to performing payment processing, such that the credit card information is charged for the product in accordance with the corrected identification.

2. The processing apparatus according to claim 1, wherein R and S are fixed values.

3. The processing apparatus according to claim 1, wherein values for R and S are prepared for each of a plurality of environments in advance, and R and S are determined based on an actual environment at a time of computing the precision.

4. The processing apparatus according to claim 1, wherein the at least one processor is further configured to execute the one or more instructions to compute the prior distribution in an actual environment at a time of computing the precision.

5. A processing method performed by a point-of-sale (POS) register installed in a store, the processing method comprising:

acquiring an image captured by a camera installed in the store along with the POS register, the image including a product;

determining an identification of the product included in the image by inputting the image to an inference device and receiving as output from the inference device an inference result including the identification of the product;

computing, based on a history of POS registers, a prior distribution of the product, the prior distribution indicating a purchase frequency of the product;

computing a precision of the identification of the product according to a predetermined equation, based on the computed prior distribution, the predetermined equation being:

$$P = \frac{pR}{pR + (1-p)(1-S)}, \quad \text{Equation (1)}$$

where P is the precision, p is the prior distribution, R is recall, and S is specificity;

determining that the precision is less than a reference value;

in response to determining that the precision is less than the reference value, displaying on a display device a user interface showing the identification of the product to the operator and a request that the operator confirm or correct the identification of the product;

after displaying the user interface, receiving via an input device input from the operator correcting the identification of the product;

receiving input of credit card information to pay for the product based on the corrected identification; and transmitting the credit card information to a server of a credit card company to performing payment processing, such that the credit card information is charged for the product in accordance with the corrected identification.

6. A non-transitory storage medium storing a program executable by a point-of-sale (POS) register installed in a store to perform processing comprising: acquiring an image captured by a camera installed in the store along with the POS register, the image including a product;

determining an identification of the product included in the image by inputting the image to an inference device and receiving as output from the inference device an inference result including the identification of the product;

computing, based on a history of POS registers, a prior distribution of the product, the prior distribution indicating a purchase frequency of the product;

computing a precision of the identification of the product according to a predetermined equation, based on the computed prior distribution, the predetermined equation being:

$$P = \frac{pR}{pR + (1-p)(1-S)}, \quad \text{Equation (1)}$$

where P is the precision, p is the prior distribution, R is recall, and S is specificity;

determining that the precision is less than a reference value;

in response to determining that the precision is less than the reference value, displaying on a display device a user interface showing the identification of the product to the operator and a request that the operator confirm or correct the identification of the product;

after displaying the user interface, receiving via an input device input from the operator correcting the identification of the product;

receiving input of credit card information to pay for the product based on the corrected identification; and transmitting the credit card information to a server of a credit card company to performing payment processing, such that the credit card information is charged for the product in accordance with the corrected identification.

* * * * *